(12) United States Patent
Knost et al.

(10) Patent No.: US 7,285,759 B2
(45) Date of Patent: Oct. 23, 2007

(54) BAKING OVEN

(75) Inventors: Dieter Knost, Dinkelsbühl (DE); Bernd Dannenhauer, Dinkelsbühl (DE)

(73) Assignee: Werner & Pfleiderer Lebensmitteltechnick GmbH, Dinkelsbuhl (DE)

( * ) Notice: Subject to any disclaimer, the term of this patent is extended or adjusted under 35 U.S.C. 154(b) by 220 days.

(21) Appl. No.: 11/115,383

(22) Filed: Apr. 27, 2005

(65) Prior Publication Data

US 2005/0235836 A1   Oct. 27, 2005

(30) Foreign Application Priority Data

Apr. 27, 2004   (DE)   .................. 10 2004 020 745

(51) Int. Cl.
| | |
|---|---|
| A21B 1/42 | (2006.01) |
| A21B 1/48 | (2006.01) |
| A21B 3/07 | (2006.01) |
| A21B 5/02 | (2006.01) |
| F27B 9/02 | (2006.01) |
| F27B 9/10 | (2006.01) |
| F27B 9/38 | (2006.01) |

(52) U.S. Cl. .................. 219/411; 219/388; 219/400; 99/443 C

(58) Field of Classification Search .................. None
See application file for complete search history.

(56) References Cited

U.S. PATENT DOCUMENTS

| | | | | |
|---|---|---|---|---|
| 2,491,687 | A * | 12/1949 | Nutt .......................... | 219/771 |
| 3,881,406 | A * | 5/1975 | Perez .......................... | 99/594 |
| 4,363,955 | A * | 12/1982 | Gauthier et al. ............. | 219/388 |
| 4,517,447 | A * | 5/1985 | Hicks .......................... | 219/388 |
| 5,277,924 | A * | 1/1994 | Padilla ........................ | 426/523 |
| 5,875,705 | A * | 3/1999 | Knost ......................... | 99/443 C |
| 6,178,878 | B1 * | 1/2001 | Haas et al. ................... | 99/353 |
| 6,369,360 | B1 * | 4/2002 | Cook .......................... | 219/388 |
| 6,572,911 | B1 * | 6/2003 | Corcoran et al. ........... | 426/510 |
| 2005/0056156 | A1 * | 3/2005 | Habermann et al. ......... | 99/386 |
| 2005/0260319 | A1 * | 11/2005 | Khalaf ....................... | 426/549 |

* cited by examiner

FOREIGN PATENT DOCUMENTS

FR   2550419 A   *   2/1985

OTHER PUBLICATIONS

DE-1004038879A1, Patent Abstract, Droege et al, Sep. 15, 2005.*

*Primary Examiner*—Joseph Pelham
(74) *Attorney, Agent, or Firm*—Browdy and Neimark, PLLC

(57) ABSTRACT

A baking oven is provided with a baking oven housing with a baking chamber. The latter is divided into at least two baking zones each of them being provided with at least one own baking oven supply inlet for the feeding of dough pieces. At least one delivery outlet is used for the delivery of the dough pieces. A first one of the at least two baking zones is configured so that a plurality of dough pieces available and conveyed on the supply side as bulk material is being baked there. A second one of the at least two baking zones is configured so that a plurality of dough pieces which are available and conveyed as individual pieces are being baked there. More-over, baking oven is provided with a circulating air source and a means of conveyance for conveying the dough pieces from the supply inlet through the baking chamber to the delivery outlet. A baking system with such a baking oven is furthermore provided with an upstream means of conveyance for conveying dough pieces to the baking oven. The result is a baking oven and a baking system equipped with the same by means of which during baking different requests of the customers can be flexibly complied with.

19 Claims, 6 Drawing Sheets

BAKING OVEN

BACKGROUND OF THE INVENTION

1. Field of the Invention

The invention relates to a baking oven having a baking oven housing, having a baking chamber, having at least one supply inlet for the feeding of dough pieces into the baking chamber, having at least one delivery outlet for the delivery of dough pieces from the baking chamber, having a circulating air source and having a means of conveyance for conveying the dough pieces from the supply inlet through the baking chamber to the delivery outlet. In addition, the invention relates to a baking system with such baking oven and a means of conveyance arranged upstream thereof for conveying dough pieces to the baking oven.

2. Background Art

Such a baking oven is known from obvious prior use. The flexibility of such a known baking oven still leaves much to be desired, in particular in respect of the requirements placed on a baking oven in a baking shop, i.e. on an oven that is directly accessible for customers in a shop.

SUMMARY OF THE INVENTION

It is, therefore, an object of the present invention to improve a baking oven of the type mentioned above so that during baking different requests of the customers can be met in a flexible manner.

Pursuant to the invention, this object is accomplished by means of a baking oven wherein the baking chamber is divided into at least two baking zones, each provided with at least one own baking oven supply inlet wherein

- a first baking zone of the at least two baking zones is designed in such a manner that a plurality of dough pieces which are available and conveyed on the supply side in the form of bulk material are baked there,
- a second baking zone of the at least two baking zones is designed in such a manner that a plurality of dough pieces which are available and conveyed as individual dough pieces are baked there.

According to the invention, it was identified that it is possible to bake in one and the same baking oven, on the one hand, dough pieces which are supplied in bulk, i.e. in form of a loose heap, on the supply inlet side and are also conveyed as such and to bake, on the other hand, dough pieces which are supplied as individual pieces and are also conveyed accordingly. Bulk material may, for instance, consist of different types of rolls. Loaves of bread or baguette are individual pieces which as a consequence are conveyed piece by piece. The baking oven according to the invention now makes it possible to bake and deliver these two different types of dough pieces. For this purpose, the baking chamber is divided into baking zones for the baking of the respective basic type of dough pieces. Furthermore, this division into zones permits the heating of the baking zones by means of one and the same source of circulating air.

The overall result is an oven by means of which flexible reactions to customer demands are made possible. This can be summarised by the catch-word "baking on demand". The baking oven can be designed as an air-circulation baking oven only, i.e. heating only by means of convection, or it may also provide a combination of convection heat and radiant heat. For this purpose, the baking oven may be provided in addition to the source of circulating air with one or several sources of radiant heat. They may in particular be provided as radiant heaters. The radiant heat sources may, for instance, be provided as sources for upper heating and/or bottom heating.

Baking drums each being provided with at least one receiving portion for dough pieces permit the automated baking of the basic types of dough pieces which are supplied as bulk material. When several baking drums are provided, and depending upon the design of the baking oven, the individual types of dough pieces may be allocated to their own baking drum, i.e. baking is performed according to the individual type; a free allocation is, however, also possible.

Vanes for circulating the circulating air which are attached to the at least one baking drum make it possible to conveniently use at the same time the rotation of the baking drums during baking also for the circulation of the circulating air. In addition, also other means may be used for the circulation of the circulating air. The vanes may be positioned alternatively or additionally on the outside of the outer wall of the baking drums.

Vanes being arranged on the front walls of the baking drum preferably extending in a radial direction can be manufactured in a cost-efficient way.

A baking drum, the outer and inner defining walls of which defining the at least one receiving portion can be used in a flexible manner.

A baking drum, the outer defining wall of which providing a baking drum supply inlet can be automatically filled and/or emptied.

A switch member co-operating with a control unit permits the charging of two baking drums by means of a conveyance portion and through a baking oven supply inlet for charging. This simplifies the design of the baking oven.

A switch member being designed as a hinged switch flap is inexpensive.

A separating device being provided upstream of the at least one baking oven supply inlet of the first baking zone permits the automatic supply of dough pieces of the basic type "bulk material" to the baking oven. The intermediate storage of a pre-determined number of dough pieces is made possible by the upstream means of conveyance.

It is inexpensive to provide an upstream means of conveyance being provided as an endless upstream conveyor belt, being provided in particular with a plurality of receiving portions for conveyance separated from each other by partition wall portions. The preferably usable plurality of supply inlets permits a controlled feeding of the dough pieces of the basic type "bulk material" to the baking chamber of the baking oven.

A configuration of the endless upstream conveyor belt being arranged above the baking oven housing and being shiftable as a whole relative to the same so that a delivery side end of the endless upstream conveyor belt can be associated with each banking oven supply inlet of the first baking zone for the delivery of dough pieces from the endless upstream conveyor belt to the baking oven supply inlet permits an automated charging of the baking oven.

An endless supply outlet conveyor belt being arranged in the lower area of the first baking zone which is adjacent to the baking oven delivery outlet of the first baking zone on the delivery side permits the easy delivery of baked dough pieces from the first baking zone. When several baking drums are provided in the first baking zone, an own endless delivery outlet conveyor belt may be associated with each baking drum in an alternative embodiment. This is expedient in particular when different types of dough pieces are baked in the different baking drums.

At least one endless dough-piece conveyor belt being adjacent on the supply side to a baking oven supply inlet of the second baking zone and on the delivery side adjacent to a baking oven delivery outlet of the second baking zone permits an easy conveyance of dough pieces that are available and conveyed as individual pieces. These dough pieces can be baked automatically, in particular when they are comparatively densely packed.

An arrangement of endless conveyor belts being arranged in decks on top of each other and being arranged below the endless delivery conveyor belt, respectively results in a compact baking oven. Moreover, the deck-like arrangement of the conveyor belts permits different temperature levels in the baking chamber which can be used for the simultaneous baking of types of dough pieces with different requirements as to their baking. Moreover, with a plurality of endless dough-piece conveyor belts, the dough pieces that are to be baked can be divided into different types.

At least one radiant heat source being arranged in the baking chamber, in particular in the second baking zone, creates the possibility to flexibly heat the baking chamber of the baking oven in accordance with the baking requirements. It is in particular possible to accomplish a pre-determined temperature distribution by pre-setting the heating output of the circulating air source on the one hand and of the radiant heat source on the other hand. This can be used for the baking of different types of dough pieces.

Radiant heaters have stood the test as generators of radiant heat.

An arrangement of the radiant heat source between the upper and the lower strand of a conveyor belt in the baking chamber saves space. In particular with the multi-deck arrangement of several conveyor belts for dough pieces, such arrangement of the radiant heat source provides the possibility to use the radiant heat source at the same time as bottom heat for the dough pieces conveyed on the upper decks and as upper heat for the dough pieces conveyed on the lower decks.

Another object of the invention is to provide a baking system in which the baking oven of the invention can be used as an automated baking oven.

This object is accomplished by the invention by means of a baking system with a baking oven described above and a means of conveyance arranged upstream thereof for conveying dough pieces to the baking oven.

The baking system according to the invention permits an automatic supply of dough pieces of both basic types of dough pieces to the baking oven permitting a controlled selection of the dough pieces which are to be supplied to each of the two baking zones.

An embodiment of the invention will be described below in greater detail by reference to the attached drawings.

DESCRIPTION OF THE PREFERRED EMBODIMENT

Figure 1:
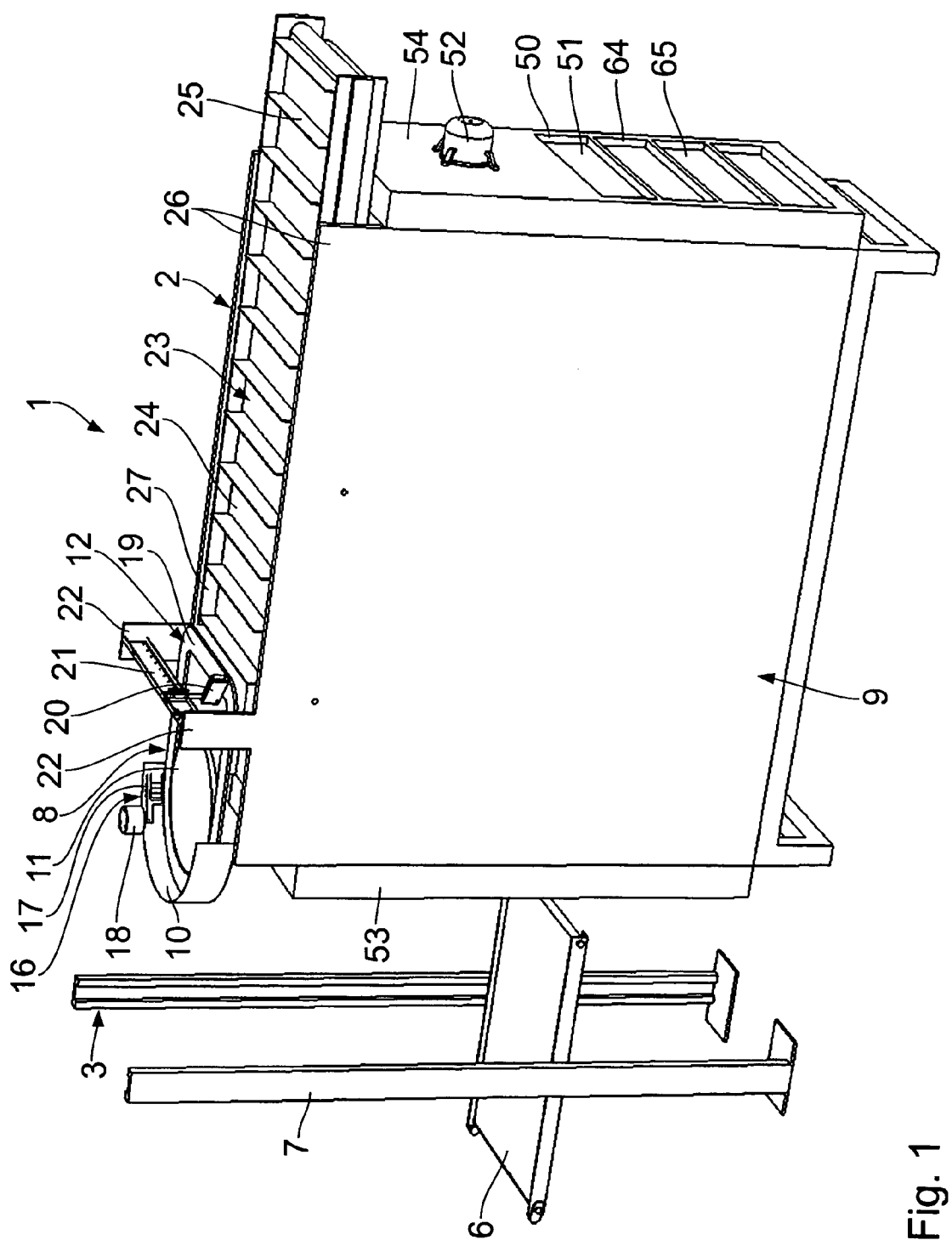
FIG. 1 shows a perspective view of a baking system with a baking oven and an upstream means of conveyance.

A baking system 1 according to FIGS. 1 to 4 with a baking oven 2 and an upstream means of conveyance 3 is used for the baking of fresh dough pieces. They are provided, on the one hand, as a plurality of dough pieces on the charging side of baking oven 2 in the form of bulk material. These dough pieces of a first basic type are in particular roll dough pieces which may also be partly frozen or deep-frozen. On the other hand, the dough pieces that are to be baked in the baking oven 2 are available as a second basic type, i.e. as a plurality of dough pieces 4, 5, for instance in the form of loaves of bread and baguette which are provided and conveyed as individual pieces.

The means of conveyance is provided with a driven endless conveyor belt 6. The latter is attached on both sides centrally between its two deflection pulleys to two lifting columns 7 holding between them the endless conveyor belt 6. By means of a lifting drive (not shown), the endless conveyor belt 6 can be raised and lowered relative to the lifting columns 7. A separator 8 which is arranged in the direction towards the means of conveyance 3 on the upper side of a baking oven housing 9 of baking oven is in conveyance connection with the endless conveyor belt 6. In the direction towards the means of conveyance 3, separator 8 is provided with a semi-circular bent baffle plate 10 which prevents dough pieces of the bulk material from falling back from separator 8 to the means of conveyance 3.

Moreover, separator 8 is provided with a round separator bottom 11 around which a slat conveyor belt 12 is arranged. Both the separator bottom 11 and the conveyor belt 12 can be driven independently of each other by means of driving motors (not shown). The top plan view of FIG. 2 shows that the separator bottom 11 is driven counter-clockwise and that the slat conveyor belt 12 is driven clockwise.

Figure 2:
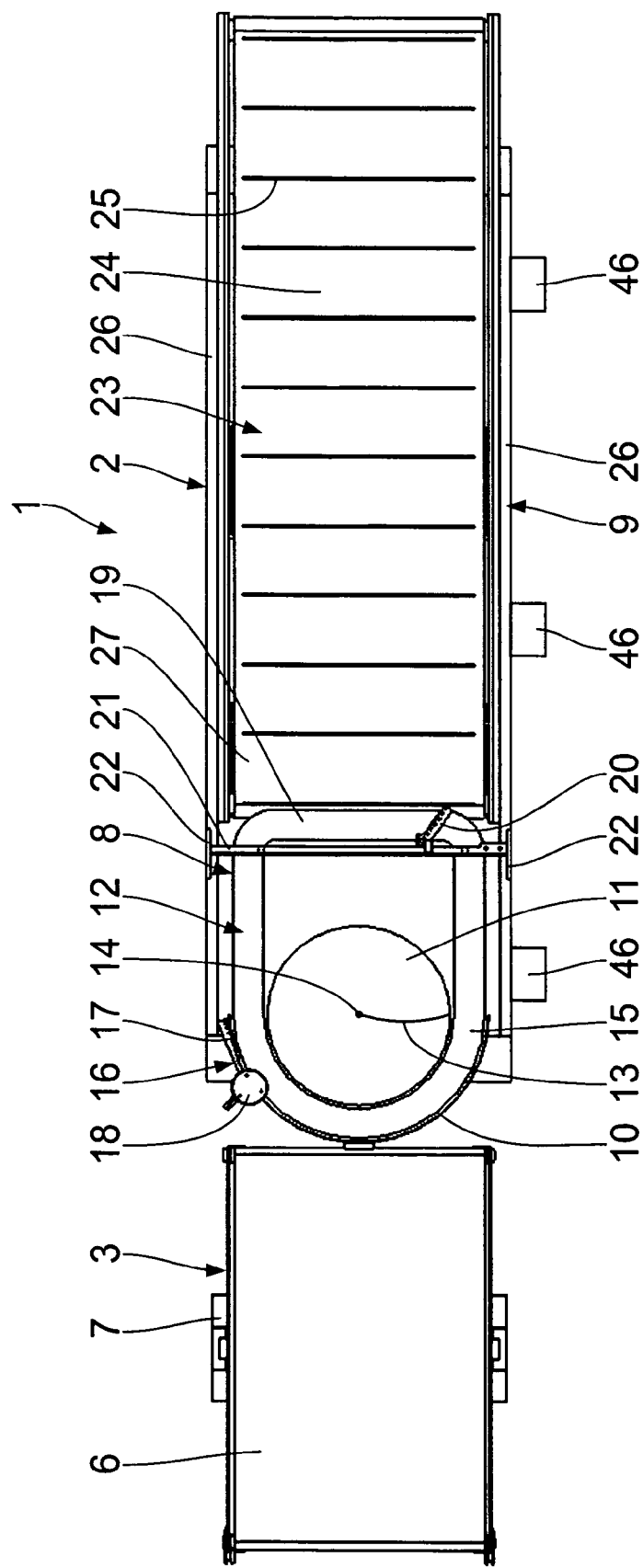
FIG. 2 is a top plan view of the baking oven with the means of conveyance.
Figure 3:
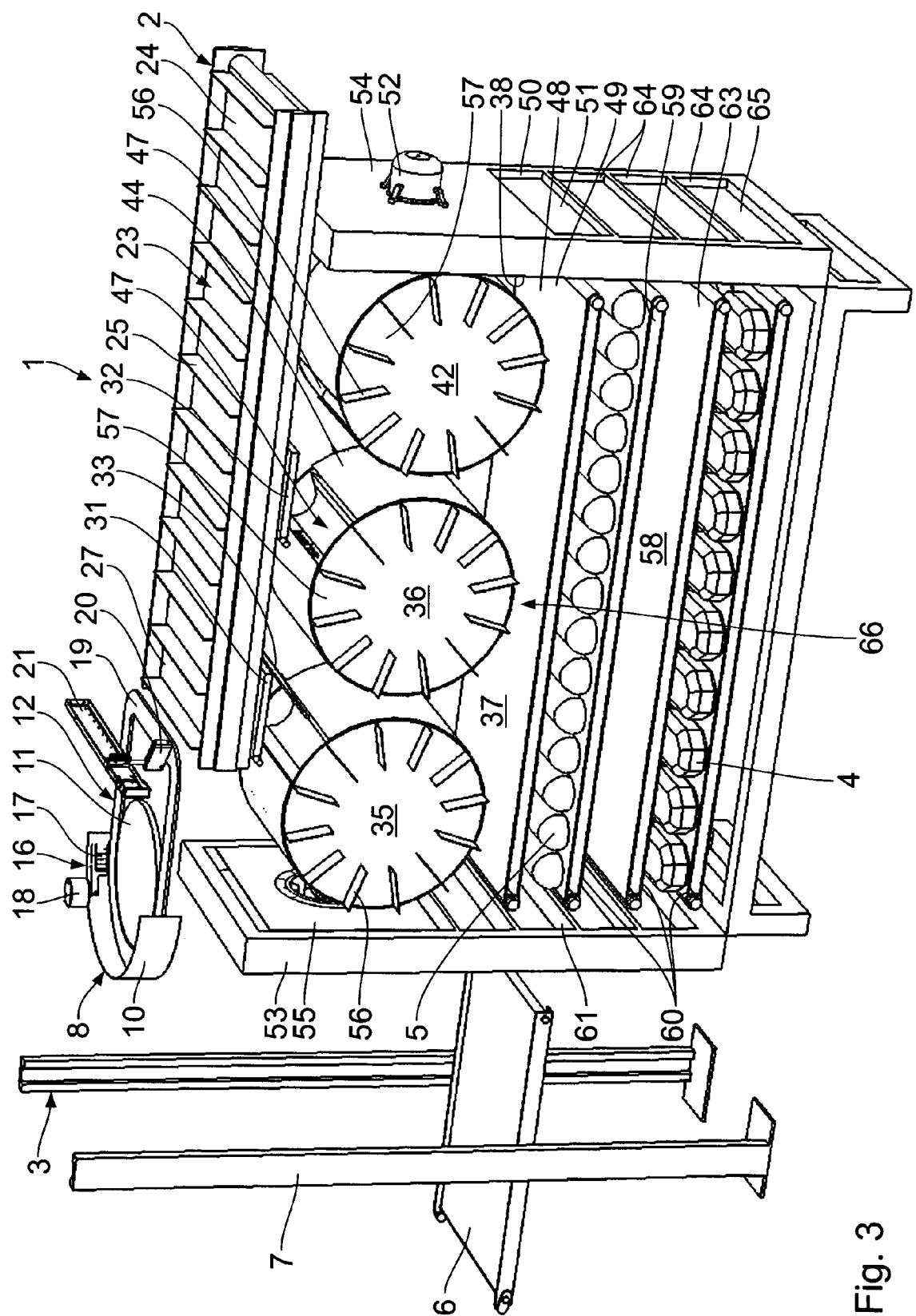
FIG. 3 shows a perspective view of the baking oven with the means of conveyance with the detached housing of the baking oven.

Almost immediately above separator bottom 11, a bent guide plate 13 which is shown in FIG. 2 only is rigidly connected to a support (not shown) attached to the baking oven housing. The said guide plate extends from a central, vertical rotation axis 14 of separator bottom 11 up to the support arranged between separator bottom 11 and the slat conveyor belt 12.

A portion of the slat conveyor belt 12 adjacent to the support-side end of guide plate 13 is hereinafter referred to as charging portion 15. Downstream of charging portion 15, a separating deflector 16 is arranged next to the slat conveyor belt 12 on its outside. The said deflector is provided with a deflection flap 17 the position of which can be changed by means of a drive unit 18 from a through position—shown in the Fig.—to a deflection position. In the latter position, the deflection flap 17 bars access to the slat conveyor belt 12. In respect to the conveyance direction of the slat conveyor belt 12 downstream, a separation sensor (not shown) which is designed as a light barrier is associated with the separation deflector 16. The top plan view of FIG. 2 shows that the slat conveyor belt 12 has approximately the form of an inverted letter "D". The straight D leg of the slat conveyor belt 12 is hereinafter referred to as delivery portion 19.

Arranged alongside delivery portion 19, a delivery slider 20 which is adjustable by a driving mechanism is provided. The said slider is guided on a guide rail 21 which is arranged above the slat conveyor belt 12 the guide rail in turn being supported between two opposite support portions 22 attached to the baking oven housing. An upstream means of conveyance 23 is arranged downstream of supply slider 20 in the conveyance direction of the dough pieces conveyed along the slat conveyor belt 12. The said means of conveyance is provided as an endless upstream conveyor belt. The upstream means of conveyance 23 is provided with a plurality of receiving portions for conveyance 24 which are separated from each other by separating wall portions 25 travelling with the means of conveyance.

The downstream means of conveyance 23 is arranged on the baking oven 2. It is provided between side walls 26 of baking oven housing 9 and can be horizontally moved in such a way that an end 27—on the left side in the drawing—of the upstream means of conveyance 23 can be associated in a receiving position with separator 8, in a first delivery position with a first baking oven supply inlet 28, and in a second delivery position with a second baking oven supply inlet 29 in the baking oven housing 9. In the drawing, the first baking oven supply inlet 28 is arranged to the left of the second baking oven supply inlet 29. Both supply inlets 28, 29 are defined in an upper defining wall 30 of baking oven housing 9 and can both be closed by means of a driven pivotal shutter 31, 32.

A switch flap 33 is arranged downstream of the first baking oven supply inlet 28 in the conveyance direction of the dough pieces. The said flap is pivotally arranged, i.e. hinged, around a swivel axis 34 perpendicular to the drawing plane of FIG. 4. The switch flap 33 as a switch member is part of a conveyance portion between the first baking oven supply inlet 28 and two baking drums 35, 36 of a first baking zone 37 of a baking chamber 38 of baking oven 2. A first conveyance slide 39 which is associated in the drawing with the left baking drum 35 is arranged downstream of the switch flap 33 in the conveyance direction of the dough pieces, as well as a second conveyance slide 40 which in the drawing is associated with the central baking drum 36.

Figure 4:
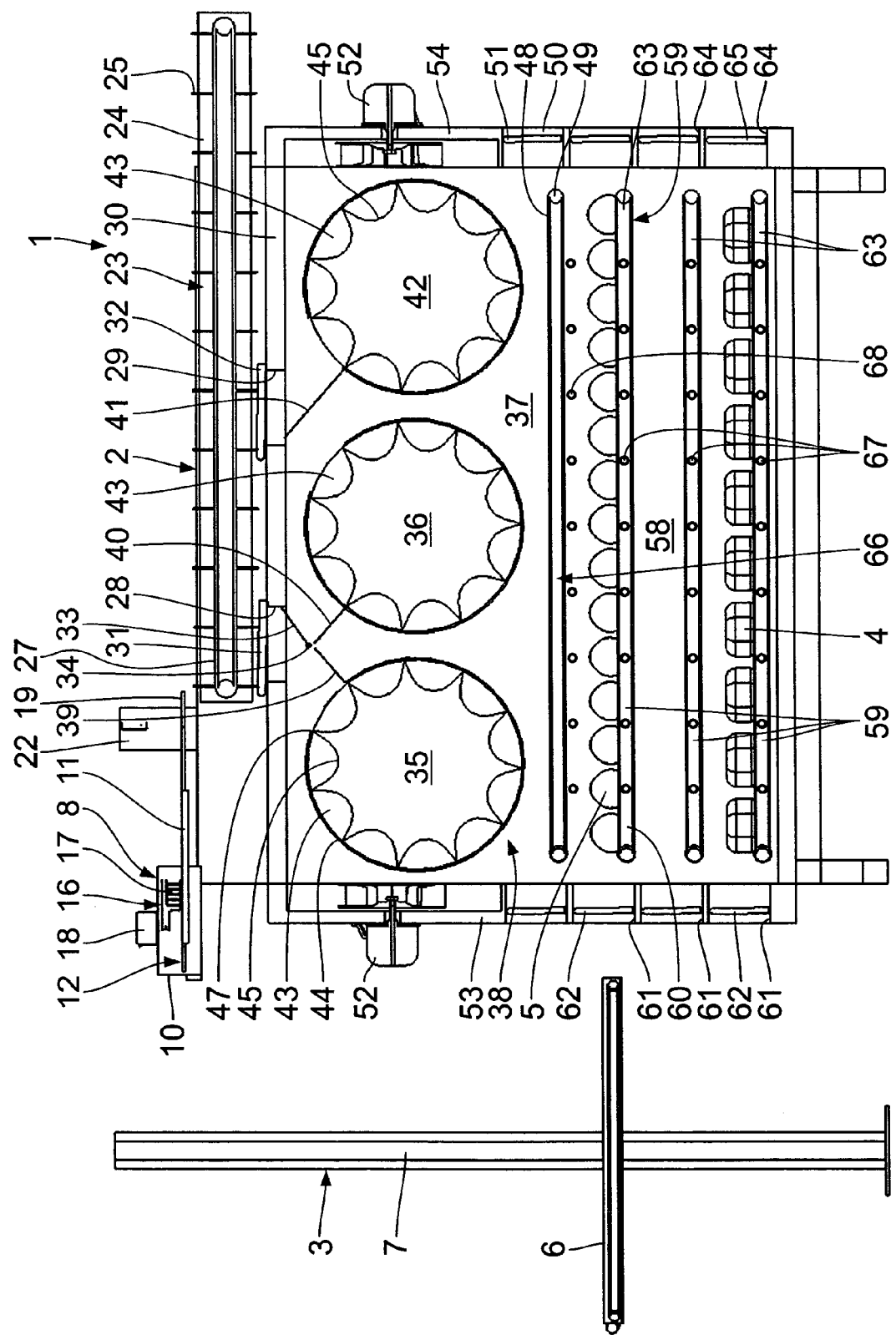
FIG. 4 shows a vertical longitudinal section through a central plane of the baking oven and of the means of conveyance.

A third conveyance slide 41 is arranged downstream of the second baking oven supply inlet 29 in the conveyance direction and is associated with a baking drum 42 which is shown on the right side in FIG. 4. All three baking drums 35, 36, 42 are of the same design so that it will suffice hereinafter to describe one of the three baking drums 35, 36, 42.

Baking drum 35 is provided with a plurality of receiving portions for dough pieces—eleven in the present embodiment. These portions are defined outwardly by an external defining wall 44 and inwardly by an internal defining wall 45 of baking drum 35. Both defining walls 44, 45 may be driven independently of each other around a rotation axis coinciding with the rotation symmetry axis of baking drum 35 by means of a drive unit 46 which is schematically shown in FIG. 2 only.

When the two defining walls 44, 45 are driven in a synchronised manner, the receiving portions 43 are also rotated around this axis of rotation. The outer defining wall 44 is provided with a through opening 47 the width of which corresponds in the circumferential direction to the width of a receiving portion 43.

An endless delivery conveyor belt 48 is arranged below the three baking drums 35, 36, 42 which are arranged next to each other. A delivery portion 49—shown on the right side in the drawing—of the endless delivery conveyor belt 48 is adjacent to a first baking oven outlet opening 50 which can be closed by means of a pivotal sealing cap 51.

Baking oven 2 is a circulating air baking oven. Two fans 52 which are equipped with relevant heating sources, i.e. heating coils, serve as circulating air source. The fans 52 are fixed to opposite side walls 53, 54 of the baking oven housing 9 which are shown in the drawing on the left and on the right side.

The fans 52 suck in the circulating air centrally from the baking chamber 38 and feed the same radially heated back to the baking chamber 38. For separating the sucking area and the feedback area in the neighbourhood of the fans 52, respective rectangular guiding plates are arranged parallel to the side walls 53, 54 within the baking chamber 38.

For circulating the circulating air generated by the fans 52 within the baking chamber 38, the baking drums 35, 36 42 are each provided on their front side with a plurality of vanes 56, i.e. twelve each. The said vanes are mounted onto the front walls 57 of the baking drums 35, 36, 42 and extend radially and straight from the outer circumference of the front walls 57 inwardly up to about half of the radius of the front walls 57.

The baking drums 35, 36, 42 and the endless delivery conveyor belt 48 are arranged within the first baking zone 37 of baking chamber 38 which is used for baking the dough pieces which are supplied and conveyed as bulk material.

Below the first baking zone 37 and freely connected with the same, a second baking zone 58 is located within the baking chamber 38. Within the same, a plurality of endless baking conveyor belts 59—three in the illustrated embodiment—are arranged in decks on top of each other and below the endless delivery conveyor belt conveyor belt 48. Conveyor belts 48, 59 are made of an air-permeable steel mesh. The endless delivery conveyor belt 48 as well as the endless baking conveyor belts 59 can be driven independently of each other.

On the endless baking conveyor belts 59 individually supplied and conveyed dough pieces are being baked piece by piece in the second baking zone 58. The uppermost endless baking conveyor belt 59 holds a number of baguette loaves 5 arranged transversely to the conveyance direction. The endless baking conveyor belt 59 at the bottom holds a number of loaves 4 transversely arranged side by side. Supply portions 60 of the endless baking conveyor belts 59 which are shown on the left side of the drawing are arranged adjacent to baking oven supply inlets 61 in the left side wall 53 of the baking oven housing 9. The baking oven supply inlets 61 can be closed by means of pivotal sealing flaps 62. Delivery portions 63 of the endless baking conveyor belts 59 which are shown on the right side of the drawing are arranged adjacent to baking oven delivery outlets 64. The latter can be closed by means of pivotal sealing caps 65.

The switch flap 33, the conveyance slides 39, 40, 41, the driven baking drums 35, 36, 42, the endless delivery conveyor belt 48 as well as the endless baking conveyor belts 59 are components of a controlled means of conveyance 66 for conveying the dough pieces of the two basic types, i.e. dough pieces supplied as bulk material through the first baking zone 37 and of the dough pieces supplied as individual pieces through the second baking zone 58 from the supply inlets 28, 29 and 61 to the delivery outlets 50, 64.

The baking system 1 is operated as follows, controlled by a control unit (not shown): For example, at first it is found out from the customer which basic type of dough pieces is to be baked. If dough pieces which are supplied as bulk material are to be baked, the dough pieces are first placed—in a manner which is not shown—on the endless conveyor belt 6 of the means of conveyance 3 located upstream of baking oven 2. The endless conveyor belt 6 is then lifted until the conveyance plane of the endless conveyor belt 6 is positioned above separator 8. By means of a transverse drive—which is not shown—the endless conveyor belt 6 as a whole is then shifted horizontally in the conveyance plane until the delivery outlet of the endless conveyor belt 6 has been positioned above separator bottom 11 of separator 8. The endless conveyor belt 6 is then driven so that a first batch of dough pieces is delivered onto the separator bottom 11. For separating the dough pieces, the separator bottom 11 in FIG. 2 rotates anti-clockwise. The dough pieces are then conveyed by means of guiding plate 13 onto the supply portion 15 of the slat conveyor belt 12. The latter is then driven clockwise in FIG. 2 so that the dough pieces which are lying on the slat conveyor belt 12 are conveyed past the deflector flap 17 of the separation deflector 16 which is initially in a 'let through position'. As soon as the first dough piece has passed the separating sensor after the separation deflector 16, the deflector flap 17 is changed over to the deflection position so that dough pieces which follow on the slat conveyor belt 12 are conveyed back to separator bottom 11.

For the first dough piece, the supply slider 20 is in the supply position which is farthest away downstream of the delivery portion 19 of the slat conveyor belt 12. The first dough piece is then conveyed from supply slider 20 under the impact of the movement of the slat conveyor belt 12 and under the influence of gravity up to the receiving portion for conveyance 24 that is closest to separator 8. While the first dough piece is transferred onto the receiving portion for conveyance 24, the separation of the next dough piece by means of separation deflector 16 and of the separating sensor can already start, as described above. For transferring the second dough piece onto the receiving portion for conveyance 24, supply slider 20 travels over a certain distance along supply portion 19 upstream so that the next separated dough piece is placed after the transfer next to the first separated dough piece in the receiving portion for conveyance 24. This procedure is now being repeated for dough pieces separated thereafter until a batch of for instance six or eight dough pieces is positioned on the receiving portion for conveyance 24.

As soon as such batch is complete, the endless conveyor belt of the upstream means of conveyance 23 is moved in the drawing over a certain distance to the right until the next receiving portion for conveyance 24 is associated with separator 8 on the supply side. Thereafter the said next receiving portion for conveyance 24 is charged as explained above. This step is repeated in cycles until a pre-determined number of receiving portions for conveyance 24 have each been charged with a batch of dough pieces.

Figure 5:
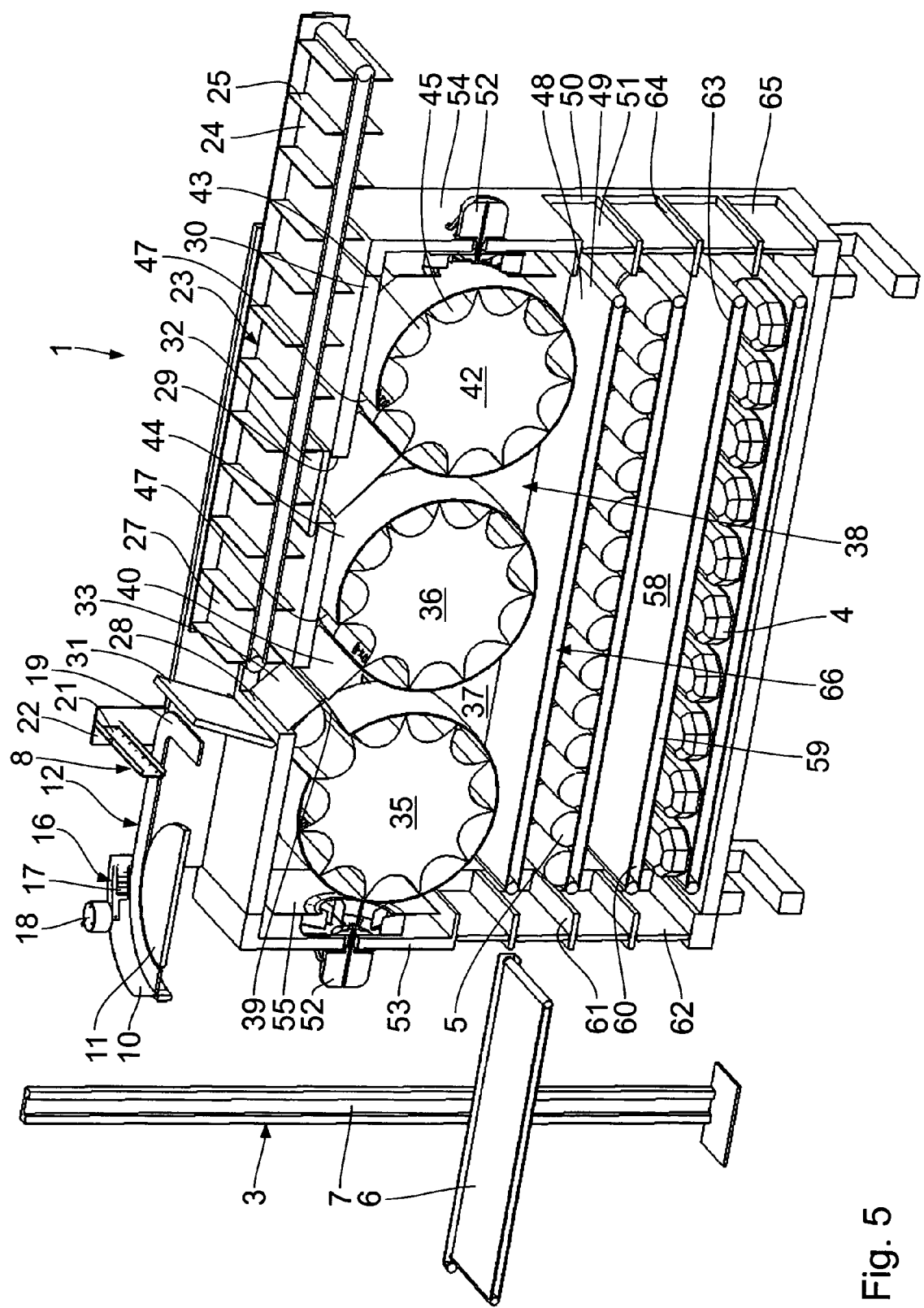
FIG. 5 shows a perspective section through the baking system—similar to FIG. 4—with an upstream means of conveyance arranged downstream of a separator in a first delivery position where the upstream means of conveyance is associated with a first baking oven supply inlet.

The described embodiment shows that it is possible to charge a total of 11 receiving portions for conveyance 24. Thereafter, the upstream means of conveyance 23 is transferred from the receiving position which is shown for instance in FIG. 1 to the first supply position which is shown in FIG. 5. Thereafter, sealing flap 31 which is associated with the first baking oven supply inlet 28 is opened as is shown in FIG. 5. Thereupon, it is decided via the control unit which of the baking drums 35, 36 is to be charged, and the switch flap 33 is set accordingly. In the position of the switch flap 33 as shown in FIG. 5, the central baking drum 36 is charged. The outer defining wall 44 of the said baking drum 36 is rotated so that passage opening 47 is positioned downstream of the second conveyance slide 40 in the direction of conveyance. This position is shown in FIG. 5. Thereafter the first receiving portion 43 of baking drum 36 can be charged. For this purpose, the endless conveyor belt of the upstream means of conveyance 23 is driven and shifted so that the supply-side batch of dough pieces falls from the receiving portion for conveyance 24 through the first baking-oven supply inlet 28 and, guided by switch flap 33 and the second conveyance slide 40, falls through passage opening 47 onto the associated receiving portion 43. Thereupon, the internal defining wall 45 is rotated over a certain distance so that the next receiving portion 43 is positioned downstream of the second conveyance slide 40 in the direction of conveyance. This charging procedure for the receiving portions 43 is now repeated in cycles for a total of ten times so that ten of the eleven receiving portions 43 of baking drum 36 have been filled. Thereafter, the outer defining wall 44 is rotated relative to the inner defining wall 45 in such a way that passage opening 47 is associated with the only unfilled receiving portion 43.

In the same way also baking drum 35 which is shown on the left side in the drawing can be charged. For this purpose, switch flap 33 is pivoted around swivel axis 34 in such a way that it forms together with the first conveyance slide 39 a conveyance connection between the first baking oven supply inlet 28 and passage opening 47 of baking drum 35.

Figure 6:
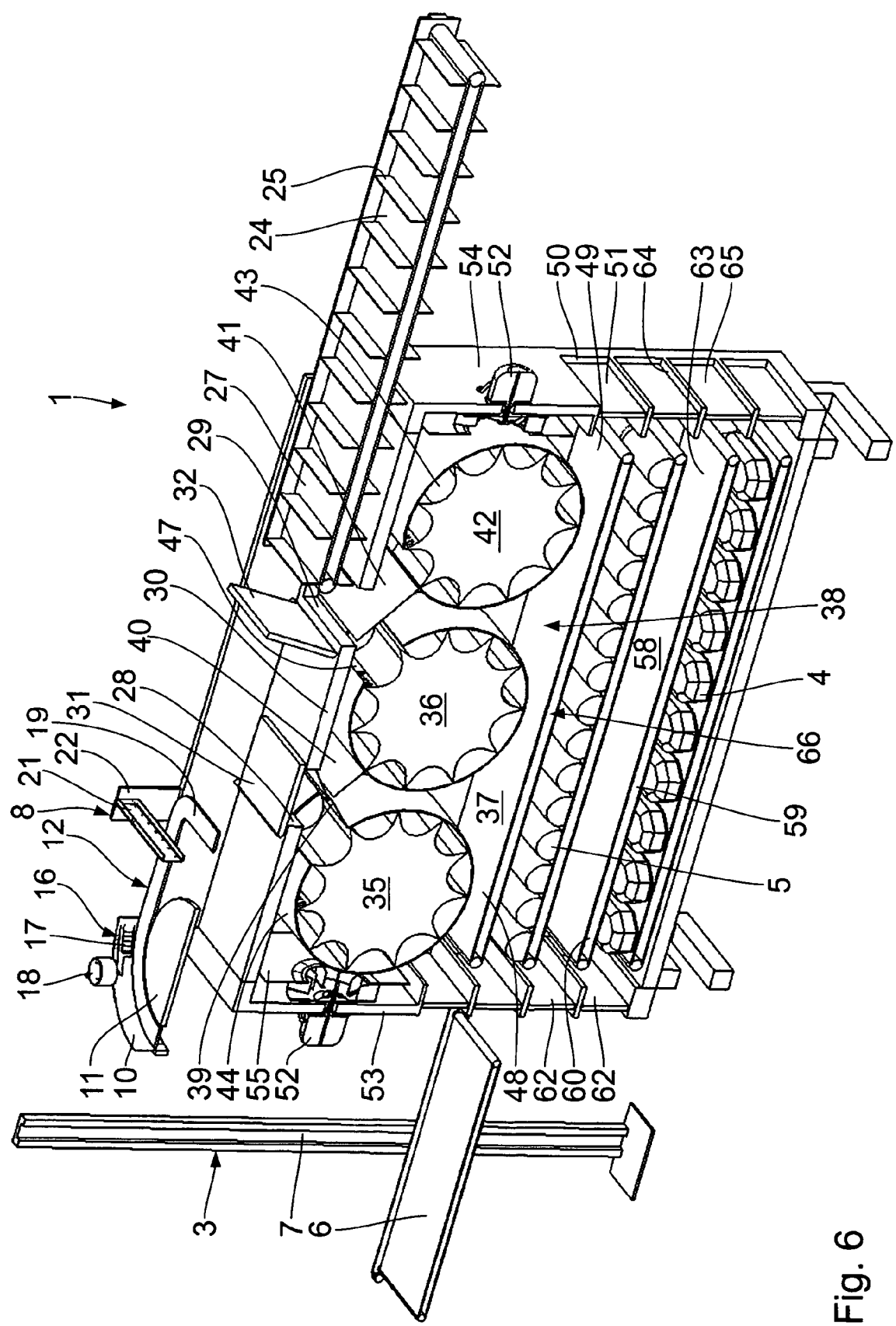
FIG. 6 shows a view similar to the one in FIG. 5 where the upstream means of conveyance is arranged in a second delivery position where it is associated with a second baking oven supply inlet.

For charging baking drum 42—shown on the right side in the drawing—the upstream means of conveyance 23 on which batches of dough pieces were placed is transferred into the second supply position according to FIG. 6. Sealing flap 31 of the second baking oven supply inlet 29 is opened. As already described above, ten of the eleven receiving portions 43 of baking drum 42 are now filled in cycles. The dough pieces in the baking drums 35, 36, 42 can now be baked in baking oven 2. For doing so, the rotation of the outer defining walls 44 is synchronised with that of the inner defining walls 45. Upon the completion of baking, the defining walls 44, 45 are synchronously rotated in respect to each other so that the passage opening 47 reaches its lowest position in which it is closest to the endless delivery conveyor belt 48. Now, the inner defining wall 45 is rotated in cycles while the outer defining wall 44 remains stationary. Synchronised with the rotation in cycles of the inner defining wall 44, the endless delivery conveyor belt 48 is always moved on over a certain distance. This synchronous shifting in cycles of the inner defining wall 45 on the one hand, and of the endless delivery conveyor belt 48, on the other hand, is continued until the baking drums 35, 36, 42 that are to be emptied are completely empty.

Thereafter, the baked pieces of dough are conveyed on the endless delivery conveyor belt 48 to the baking-oven delivery outlet 50. The baked dough pieces can then leave the baking-oven delivery outlet 50 through the opened sealing flap 51. The baked dough pieces are then transferred into a storage bin—which is not shown—from where they can be taken out by the customer.

Each of the baking drums 35, 36, 42 may be associated with a specific type of dough pieces of the first basic type. In baking drum 35, rolls may, for instance, be baked which require a comparatively short baking time while rolls are baked in baking drum 42 which require a comparatively long baking time. Alternatively, it will be appreciated that it is possible not to associate the types of dough pieces with baking drums 35, 36, 42 and to pre-set the baking times by means of the central control unit.

If, for instance upon the request of a customer, individually supplied and conveyed dough pieces, e.g. loaves of bread 4 or baguette 5 are to be baked, the same are at first placed piece by piece on the endless conveyor belt 6 in a manner which is not shown. Thereupon, one of the endless baking conveyor belts 59 in the second baking zone 58 is selected on which the baking is to be done. The endless conveyor belt 6 of the means of conveyance 3 will then be brought to the same height as the selected endless conveyor belt 59. With the transverse drive, the endless conveyor belt 6 is moved from its position until it is adjacent to the baking oven supply inlet 61 of the selected endless baking conveyor belt 59. Thereafter, the dough pieces on the endless conveyor belt 6 are moved past the opened sealing flap 62 and transferred through the baking-oven supply inlet 61 onto the selected endless baking conveyor belt 59.

This transfer is continued until the endless conveyor belt 6 has been emptied. If necessary, the endless conveyor belt 6 may be charged once again in order to fully charge a selected endless baking conveyor belt 59 or also in order to charge all endless baking conveyor belts 59 of the second baking zone 58. As soon as the charging is completed, the dough pieces are baked on the endless baking conveyor belts 59 in the second baking zone 58.

Owing to the deck-like arrangement of the endless baking conveyor belts 59 below the endless delivery conveyor belt 48, a temperature stratification is generated in the baking chamber of baking oven 2. The temperature in the area of the lower endless baking conveyor belt 59 is somewhat lower than that of the endless baking conveyor belt 59 arranged above it. Further up, the temperature increases still further. In the first baking zone 37, the temperature is highest. This temperature stratification can be used in order to bake different types of dough pieces on the different endless baking conveyor belts 59. Upon the completion of baking in the second baking zone 58, the baked dough pieces are conveyed on the selected endless baking conveyor belt 59 to the respective baking-oven delivery outlet 64 and transferred past the opened sealing flap 65 into a storage bin—which is not shown—from where they may be taken out by the customer.

Upon request, dough pieces which belong to one of the basic types described above can be baked with baking oven 2. Also within the basic types, dough pieces with different baking requirements as to baking time and baking temperature can be baked.

Apart from the circulating air source, baking oven 2 is provided with a plurality of radiant heaters 67—schematically indicated in FIG. 4 only—as additional heating elements which generate radiant heat. The same are shown in cross-section in FIG. 4. The radiant heaters 67 are provided with an electric resistance heating and are arranged between the upper strand and the lower strand of the endless baking conveyor belts 59. The radiant heaters 67 in the lowest endless baking conveyor belt 59 are used for generating bottom heat for dough pieces which are arranged on the lowest endless baking conveyor belt 59. The radiant heaters 67 in the central endless baking conveyor belt 59 are used for generating upper heat for dough pieces which are arranged on the lowest endless baking conveyor belt 59 and bottom heat for dough pieces which are arranged on the central endless baking conveyor belt 59. The radiant heaters 67 in the uppermost endless baking conveyor belt 59 are used for generating upper heat for dough pieces which are arranged on the central endless baking conveyor belt 59 and bottom heat for dough pieces which are arranged on the uppermost endless baking conveyor belt 59. Additional radiant heaters 68 arranged below the endless delivery conveyor belt 48—indicated schematically in cross-section in FIG. 4 only—are provided which also serve as sources of radiant heat for baking oven 2. The radiant heaters 68 generate upper heat for dough pieces which are arranged on the uppermost endless baking conveyor belt 59.

Temperature distribution within baking oven 2, in particular temperature stratification, can be controlled via the heating radiators 67, 68. The heating capacity of radiant heaters 67, 68 can be pre-set by the central control unit independently for each of them.

In this specification the priority application(s) is/are incorporated by reference.

What is claimed is:

1. Baking oven (2)
    having a baking oven housing (9)
        having a baking chamber (38),
        having at least one supply inlet (28, 29, 61) for the feeding of dough pieces (4, 5) into the baking chamber (38),
        having at least one delivery outlet (50, 64) for the delivery of dough pieces (4, 5) from the baking chamber (38),
    having a circulating air source (52),
    having a means of conveyance (66) for conveying the dough pieces (4, 5) from the supply inlet (28, 29, 61) through the baking chamber (38) to the delivery outlet (50, 64),
    wherein the baking chamber (38) is divided into at least two baking zones (37, 58), each provided with at least its own baking oven supply inlet (28, 29, 61) wherein
    a first baking zone (37) of the at least two baking zones (37, 58) is designed in such a manner that a plurality of dough pieces which are available and conveyed on the supply side in the form of bulk material are baked there,
    a second baking zone (58) of the at least two baking zones (37, 58) is designed in such a manner that a plurality of dough pieces which are available and conveyed as individual dough pieces (4, 5) are baked there,
    wherein a first baking zone (37) of the at least two baking zones (37, 58) is provided with at least one baking drum (35, 36, 42) each being provided with at least one receiving portion (43) for dough pieces and an outer defining wall (44), with a drive unit (46) being provided by means of which the receiving portion (43) is driven around a horizontal rotation axis.

2. Baking oven according to claim 1, wherein vanes (56) for circulating the circulating air are attached to the at least one baking drum (35, 36, 42).

3. Baking oven according to claim 2, wherein the vanes (56) are arranged on the front walls (57) of the baking drum (35, 36, 42) preferably extending in a radial direction.

4. Baking oven according to claim 1, wherein the at least one receiving portion (43) is outwardly defined by the outer defining wall (44) of the baking drum (35, 36, 42) and is inwardly defined by an inner defining wall (45), with the drive unit (46) being defined so that the two defining walls (44, 45) are driven independently relative to each other around the rotation axis.

5. Baking oven according to claim 1, wherein a baking drum supply inlet (47) is provided in the outer defining wall (44) of the baking drum (35, 36, 42), the means of conveyance (66) being provided with a conveyance portion (33, 39, 40, 41) from the at least one baking oven supply inlet (28, 29) to the baking drum supply inlet (47).

6. Baking oven according to claim 5, wherein two baking drums (35, 36, 42) are provided, the conveyance portion (33, 39, 40) being provided with a switch member (33) which co-operates with a control unit so that via the switch element

(33) a controlled conveyance from the baking oven supply inlet (28) to the baking drum supply inlet (47) of the baking drum (35, 36) which is selected by means of the control unit is made.

7. Baking oven according to claim 6, wherein the switch member (33) is designed as a hinged switch flap.

8. Baking oven according to claim 1, wherein a dough-piece separator (8) is provided upstream of the at least one baking oven supply inlet (28, 29) of the first baking zone (37).

9. Baking oven according to claim 8, wherein
an upstream means of conveyance (23) for separated dough pieces is arranged between the dough-piece separator (8) and the baking oven supply inlet (28, 29),
the upstream means of conveyance (23) is provided as an endless upstream conveyor belt, being provided in particular with a plurality of receiving portions for conveyance (24) separated from each other by partition wall portions (25).

10. Baking oven according to claim 1, wherein an endless delivery conveyor belt (48) is arranged in the lower area of the first baking zone (37) which is adjacent to a baking oven delivery outlet (50) of the first baking zone (37) on the delivery side.

11. Baking oven according to claim 1, wherein the second baking zone (58) of the two baking zones (37, 58) is provided with at least one endless baking conveyor belt (59) which is adjacent on the supply side to a baking oven supply inlet (61) of the second baking zone (58) and on the delivery side adjacent to a baking oven delivery outlet (64) of the second baking zone (58).

12. Baking oven according to claim 11, comprising a plurality of endless baking conveyor belts (59) arranged in decks on top of each other.

13. Baking oven according to claim 10, wherein the at least one endless baking conveyor belt (59) is arranged below the endless delivery conveyor belt (48).

14. Baking oven according to claim 1, comprising at least one radiant heat source (67, 68) which is arranged in the baking chamber (38).

15. Baking oven according to claim 14, wherein the at least one radiant heat source (67, 68) is provided as a radiant heater.

16. Baking oven according to claim 14, wherein the at least one radiant heat source (67, 68) is arranged between the upper and the lower strand of a conveyor belt (59) in the baking chamber (38), the conveyor belt (59) being permeable to heat radiation.

17. Baking system (1) with a baking oven (2) according to claim 1 and a means of conveyance (3) arranged upstream thereof for conveying dough pieces to the baking oven (2).

18. Baking oven according to claim 14, comprising at least one radiant heat source (67, 68) which is arranged in the baking chamber (38) in the second baking zone.

19. Baking oven (2)
having a baking oven housing (9)
having a baking chamber (38),
having at least one supply inlet (28, 29, 61) for the feeding of dough pieces (4, 5) into the baking chamber (38),
having at least one delivery outlet (50, 64) for the delivery of dough pieces (4, 5) from the baking chamber (38),
having a circulating air source (52),
having a means of conveyance (66) for conveying the dough pieces (4, 5) from the supply inlet (28, 29, 61) through the baking chamber (38) to the delivery outlet (50, 64),
wherein the baking chamber (38) is divided into at least two baking zones (37, 58), each provided with at least its own baking oven supply inlet (28, 29, 61) wherein
a first baking zone (37) of the at least two baking zones (37, 58) is designed in such a manner that a plurality of dough pieces which are available and conveyed on the supply side in the form of bulk material are baked there,
a second baking zone (58) of the at least two baking zones (37, 58) is designed in such a manner that a plurality of dough pieces which are available and conveyed as individual dough pieces (4, 5) are baked there,
wherein a dough-piece separator (8) is provided upstream of the at least one baking oven supply inlet (28, 29) of the first baking zone (37), an upstream means of conveyance (23) for separated dough pieces being arranged between the dough-piece separator (8) and the baking oven supply inlet (28, 29),
wherein the upstream means of conveyance (23) is provided as an endless upstream conveyor belt, being provided in particular with a plurality of receiving portions for conveyance (24) separated from each other by partition wall portions (25),
wherein the endless upstream conveyor belt is arranged above the baking oven housing (9) and can be shifted as a whole relative to the same so that a delivery side end (27) of the endless upstream conveyor belt (23) can be associated with each baking oven supply inlet (28, 29) of the first baking zone (37) for the delivery of dough pieces from the endless upstream conveyor belt (23) to the baking oven supply inlet (28, 29).

* * * * *